United States Patent [19]

Shepheard

[11] Patent Number: 4,623,172

[45] Date of Patent: Nov. 18, 1986

[54] PIPE COUPLING

[75] Inventor: Thomas E. Shepheard, Norfolk, Va.

[73] Assignee: Air-A-Plane Corporation, Norfolk, Va.

[21] Appl. No.: 729,735

[22] Filed: May 2, 1985

[51] Int. Cl.[4] .............................................. F16L 37/00
[52] U.S. Cl. .................................. 285/309; 285/310; 285/320; 285/364; 403/114
[58] Field of Search .............. 285/308, 309, 310, 311, 285/312, 313, 320, 158, 159, 189, 364, 406; 403/114, 121

[56] References Cited

U.S. PATENT DOCUMENTS

| | | | |
|---|---|---|---|
| 297,880 | 4/1884 | Van Riper et al. | 285/311 |
| 317,030 | 5/1885 | Siddall | 285/311 |
| 476,711 | 6/1892 | Whelan | 285/349 |
| 762,777 | 6/1904 | Vernon | 285/311 |
| 804,121 | 11/1905 | Hawkins | 403/114 |
| 935,587 | 9/1909 | Casey | 285/311 |
| 953,061 | 3/1910 | Ruland | 285/320 |
| 969,019 | 8/1910 | Wilson et al. | 285/311 |
| 1,361,856 | 12/1920 | Heininger | 285/311 |
| 1,369,304 | 2/1921 | Schram | 285/320 |
| 1,798,530 | 3/1931 | Haigh | 403/114 |
| 2,487,801 | 11/1949 | Healy, Jr. | 285/311 |
| 2,495,754 | 1/1950 | Nance | 285/320 |
| 2,723,571 | 11/1955 | Koenig | 403/114 |
| 2,888,278 | 5/1959 | Torres et al. | 285/313 |
| 3,445,127 | 5/1969 | Clarke | 285/320 |
| 3,490,792 | 1/1970 | Piegza | 285/308 |
| 3,494,641 | 2/1970 | Caregnato | 285/320 |
| 3,618,988 | 11/1971 | Zurmeuhlen | 285/347 |
| 3,721,359 | 3/1973 | Howell et al. | 285/320 |
| 3,830,525 | 8/1974 | Ransford, III | 285/311 |
| 4,268,071 | 5/1981 | Hanchen et al. | 285/320 |
| 4,333,360 | 6/1982 | Simmons | 403/114 |

Primary Examiner—Cornelius J. Husar
Assistant Examiner—Anthony Knight
Attorney, Agent, or Firm—Nies, Webner, Kurz & Bergert

[57] ABSTRACT

A pipe joint has a pair of latching hooks pivotal on opposite sides of a tubular coupling member, which hooks engage into slots in an annular plate and, when pivoted, lock over the slot ends. The hooks are simultaneously actuated by levers having free ends connected to a ring which surrounds the tubular member and is manually rotatable in the circumferential direction thereof so as to pivot the hooks to or from locking engagement with the annular plate at the ends of the slots.

6 Claims, 3 Drawing Figures

PIPE COUPLING

FIELD OF INVENTION pipe joints and couplings, essential catch, pivoted; or end to side or plate in Class 285, subclass 320 or subclass 209.

OBJECTS

The primary object of this invention is to provide a pipe coupling wherein an end of a tube is coupled to an apertured plate by means of hooks which engage in slots in the plate. A more specific object is to provide operating levers for manually pivoting the hooks to or from engagement with the plate, with great mechanical advantage in that the power arms of the levers are much longer than the resistance arms. In this configuration a particular object is to provide for simulataneously operating of the levers by means of a ring which is rotatably engaged around the tube and which is connected to the power arms of the levers. Thus, by manually rotating the ring, the hooks are forced to or from hooking engagement with the annular plate at the ends of the slots in the plate.

A further object is to provide a tube coupler with lever-operated hooks which engage in slots in an annular plate of the coupled tube, wherein the hooks are actuated by a ring rotatably mounted on the coupling tube and wherein rotation of the ring in the direction which pivots the hooks in the direction to lock the hooks, exerts torque on the coupling member in the direction which forces the hooks toward the end of the slots in which they are engaged.

Another object of this invention is to provide a pipe coupling wherein a hook is pivoted on a tube for engagement through a slot in an apertured plate, the hook being manually pivotal between a first position in which it can pass freely through the slot upon relative axial movement of the tube and plate towards one another and a second position angularly spaced from the first position wherein the hook overlies the plate at one end of the slot, thereby blocking separative movement of the tube and plate, plus manually operable means for swinging the hook back and forth between its two angular positions.

In conjunction with the foregoing, it is intended now to provide an edge, e.g., a knee, on the backside of a hook, so profiled that it engages the adjacent end of the slot upon relative rotation of the tube and plate in a direction which otherwise would permit to swing to its first or unlocking position. By this means, deliberate manipulation of the hook is required to permit it to pass freely through the slot and thereby permit the tube and plate to separate.

An additional object is to provide an upstanding lip at that end of the slot over which the hook engages, thereby further militating against relative rotation of the tube and plate so long as the hook remains in the second or locking position.

A further object of the system, whose broad object is to pivot a hook between the non-coupling position (in which a tube and plate are free to move to and fro in the axial direction of the tube) and wherein a manually operable lever is pivoted between two extreme positions respectively corresponding to the non-coupling and coupling positions of the hook, to provide a toggle action, wherein the pivot for the lever is supported on the tube by means of a link which tends to maintain the manually operable lever in one or the other of its two extreme positions.

These and other objects will be apparent from the drawing in which.

Figure 2:
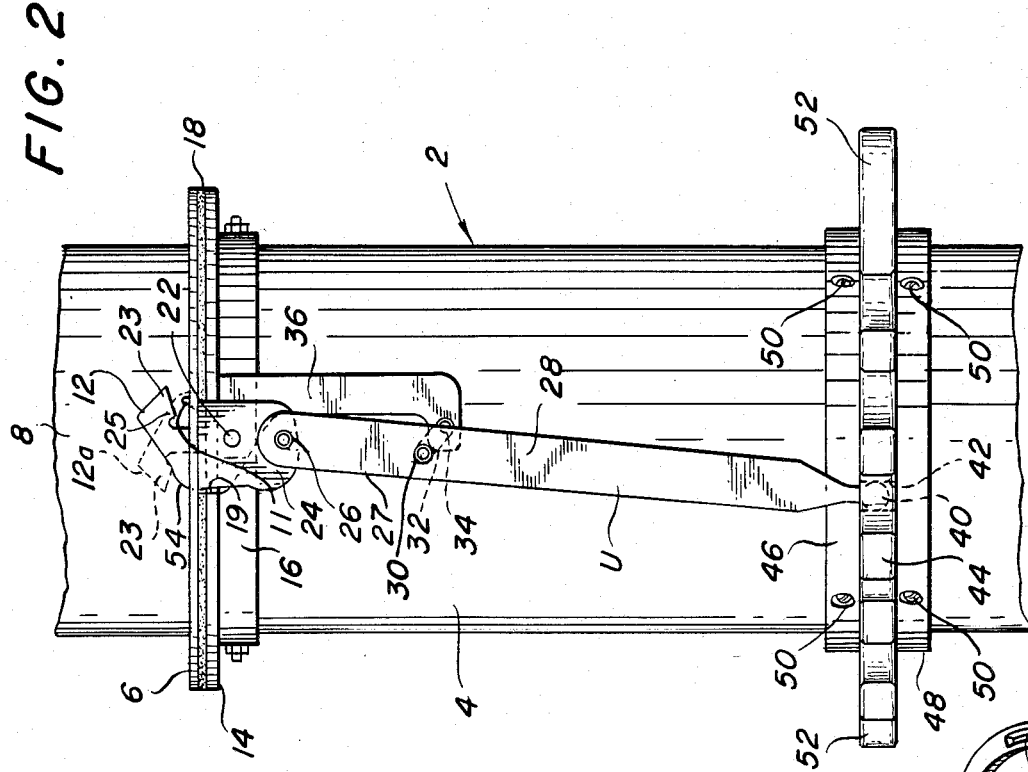
FIG. 2 is a side elevation of the coupling in unlocked condition.

Referring now to the drawing in which like references denote similar elements, the pipe joint 2 is comprised of a tube 4 having an annular flange 14 which locks against a plate 6 which, in this instance, is an annular flange on a tube 8 to which tube 4 is to be coupled. On opposite sides of plate 6 are elongate slots 10, 10a having raised lips 11 at their ends, over which hooks 12, 12a engage. Since the hooks and operating levers on the opposite sides of the tubular coupling member 8 are identical, those on one side only will be detailed. An annular flange 14 on a boss 16 at the end of the tube 4 provides a seat for a gasket 18 which seals against the plate to which the tube is coupled. There are gaps 19 in flange 14 which accommodate the hooks and permit them to swing freely between their locking and unlocking positions. Boss 16 is secured, for example, by means of bolts to the end of the tube 4.

Hooks 12 or 12a each have a free end 23 which engages through a slot 10 and which, when actuated, locks down over the lipped end of slot 10 or 10a in plate 6. Notches 25 in the forward edges of the hooks fit over the lips 11 or 11a at the end of slot, thereby militating against relative rotation of the tube and plate, once the hooks are swung down to their locking positions. On the other end of a pivot 22, each hook has a shank constituted by a relatively short lever arm 24 which is pivoted as a 26 to the load arm 27 of elongate lever 28. Lever 28 is pivoted as a 30 to a link 32 which, in turn, is pivoted at 34 to the free end of an L-shape bracket 36 which depends from boss 16. The free or power end of each lever 28 is connected to the ring by ball joint consisting of ball 40 in a socket 42 in a ring 44. The ring is rotatably mounted around the tube 4 between flanges 46, 48 secured as by screws 50 to the tube 4. The ring preferably has diametrically opposed handles 52. In operation, rotation of ring 44 swings lever to its unlocked condition U, as shown in FIG. 2, or to its locked position L, shown in full lines in FIG. 1. With the lever 28 in its unlocked position, the end of the tubular coupling is pushed against the annular flange 6, the hooks 12, 12a pass freely through the slots 10, 10a in the flange. Ring 44 is then rotated in a clockwise direction, as seen from the lower end of the coupling, so as to swing lever 28 to its locked position L. This motion swings the short end of lever arm 24 to the left, as seen in the drawing, thereby rotating the hooks 12, 12a over the lips at the ends of the respective slots. The force exerted against levers 28, 28a so as to swing them and thereby pivot hooks 12, 12a from their unlocking position to their locked position exerts a torque on the tube 4 in the direction which tends to seat the free ends 23 of hooks 12, 12a against the lipped ends of slots 10, 10a.

Deliberate manipulation of the hooks is needed to free them from their locked positions. Relative rotation of the tube and plate will not free the hooks from their locked positions, not only because of the engagement of notches 25 over lips 11 at the slot ends but also because the knee 54 on the back edge of each hook (i.e., the edge remote from the forward) is so profiled as to abut against the slot end and thereby prevent the hooks from swinging to their unlocking positions when attempt is made to rotate the tube in the direction which would clear the hooks from the lipped ends of the slots.

Figure 1:
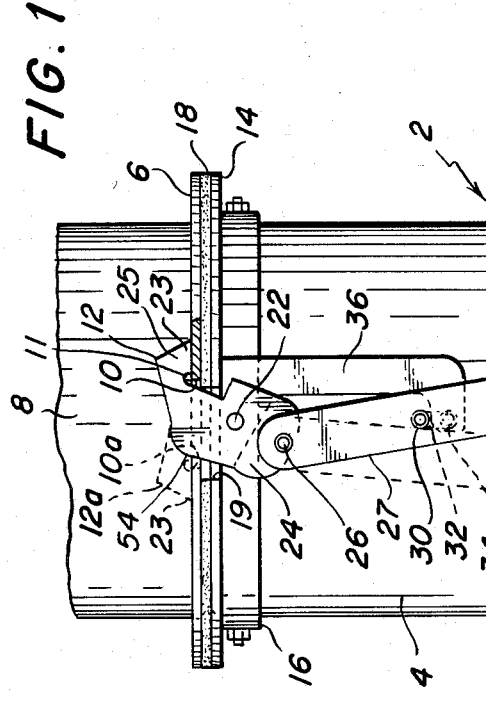
FIG. 1 is a side elevation of the coupling in locked position.
Figure 3:
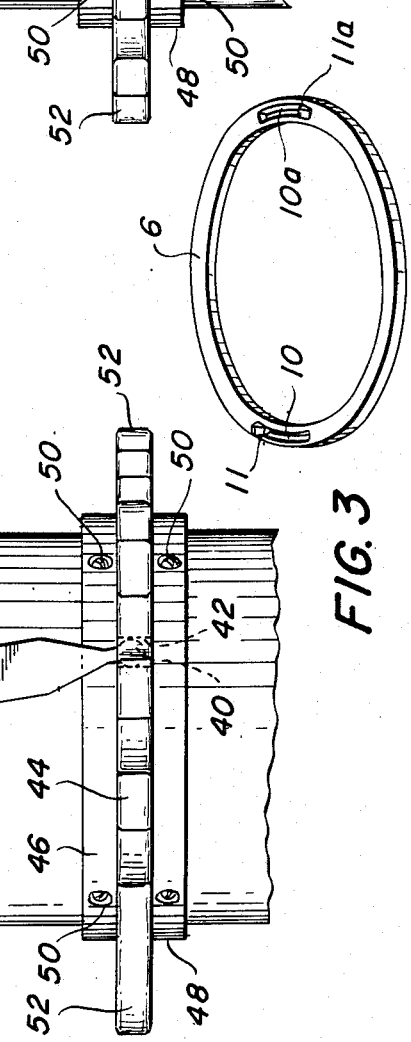
FIG. 3 is a perspective view of the flange removed the assembly.

Furthermore, by comparing FIG. 1 with FIG. 2, it will be seen that the link 32, provides a toggle action such that, when the hook is in its locking position (FIG. 1), pivot 30 must swing "over center" when lever 28 swings from its locked position of FIG. 1 to its unlocked position of FIG. 2. The length of lever 28 provides ample mechanical advantage to overcome the resistance of the toggle, but the arm 24 of hook 12 places it at a mechanical disadvantage and thereby tends to hold the hook in its locking position.

As used herein, the term "lever of the first class" means a rigid member or bar having one end (power end) to which a force or power is applied and an opposite end (resistance end) to which a resistance or load is applied and a fulcrum or pivot between the force end and the resistance end.

I claim:

1. A coupling for connecting an end of a tube to an apertured plate, comprising
   a pair of slot means through the plate on respectively opposite sides of the aperture,
   a tube,
   a first pair of levers of the first class on respectively opposite sides of the tube and having resistance ends with hooks thereon extending through the slots in the plate,
   said first pair of levers being pivoted to said tube for swinging movement about axes disposed radially of the tube between locked positions in which the hooks engage over the plate at ends of the slots and an unlocked position in which the hooks are free from the plate at the slot ends,
   a second pair of levers of the first class being pivotal by means on said opposite sides of the tube for swinging about axes extending radially of the tube, said second pair of levers having resistance ends pivoted to force ends of the first pair of levers,
   and means connected to force ends of the second pair of levers for simultaneously swinging the same about their pivotal axes between opposite extreme positions whereby to swing the first pair of levers between their locked and unlocked positions,
   the pivotal means each comprising a link having one end supported by a pivot fixed with respect to the tube and another end pivotally supporting one of the second pair of levers for swinging about a shifting pivotal axis and constituting a toggle.

2. A coupling as claimed in claim 1, the means connected to the force ends of the second pair of levers comprising a ring rotatably mounted around the tube.

3. A coupling as claimed in claim 2, the pivotal connection between the ring and the force ends of the second pair of levers comprising ball joints.

4. A coupling as claimed in claim 2, the force ends of the second pair of levers being substantially longer than the resistance ends of the first pair of levers whereby to provide mechanical advantage over the resistance ends of the first pair of levers.

5. A coupling as claimed in claim 2, wherein rotation of the ring in a direction such as to cause the hook ends of the first pair of levers to engage over the plate at said slot ends exerts a torque on the tube tending to force the same in a direction which seats the hooks against the slot ends.

6. A coupling as claimed in claim 1, each hook having a forward edge which engages against the plate adjacent said slot end and a rear edge which is disposed generally oppositely from the forward edge, said rear edge being so profiled as to provide abutment means for engaging against the opposite end of the slot upon relative rotation of the tube and plate in a direction which moves the abutment means against the end of the slot.

* * * * *